United States Patent [19]

Dupuis

[11] 4,071,180

[45] Jan. 31, 1978

[54] APPARATUS FOR PREFORMING WIRE LEADS AND ALIGNMENT FOR BONDING

[75] Inventor: Jean Marcel Dupuis, Ottawa, Canada

[73] Assignee: Northern Telecom Limited, Montreal, Canada

[21] Appl. No.: 729,485

[22] Filed: Oct. 4, 1976

[51] Int. Cl.² ............... B23K 21/02; H01L 21/601
[52] U.S. Cl. .................... 228/1 R; 29/591; 228/5.1; 228/6 A
[58] Field of Search ............ 228/1, 5.1, 15.1, 6 A, 228/180 A, 32; 29/591, 628, 626, 630 R, 630 B

[56] References Cited

U.S. PATENT DOCUMENTS

| 3,882,597 | 5/1975 | Chayka | 29/626 |
|---|---|---|---|
| 3,887,783 | 6/1975 | Comette | 228/5.1 X |
| 3,938,722 | 2/1976 | Kelly | 228/6 A X |
| 3,968,563 | 7/1976 | Hamlin | 228/180 A X |

OTHER PUBLICATIONS

Grossman, *Electronics,* "Film–Carrier Technique Automates the Packaging of IC Chips," May 16, 1974, pp. 89-95.

*Primary Examiner*—Al Lawrence Smith
*Assistant Examiner*—Nicholas P. Godici
*Attorney, Agent, or Firm*—Sidney T. Jelly

[57] ABSTRACT

In an apparatus for preforming the ends of wire leads of lead frames, prior to bonding, the lead frames are fed successively through a preforming position. A positioning and alignment device is provided correctly positioning the lead frames prior to preforming, the device using as datum surfaces, surfaces used to position the lead frames during manufacture. Typically the lead frames are produced on perforated strip film and the perforations act as positioning datum surfaces during manufacture and during preforming. After preforming the lead frames are fed to a bonding position for automatic bonding, as by an ultrasonic wobble bonding tool.

23 Claims, 23 Drawing Figures

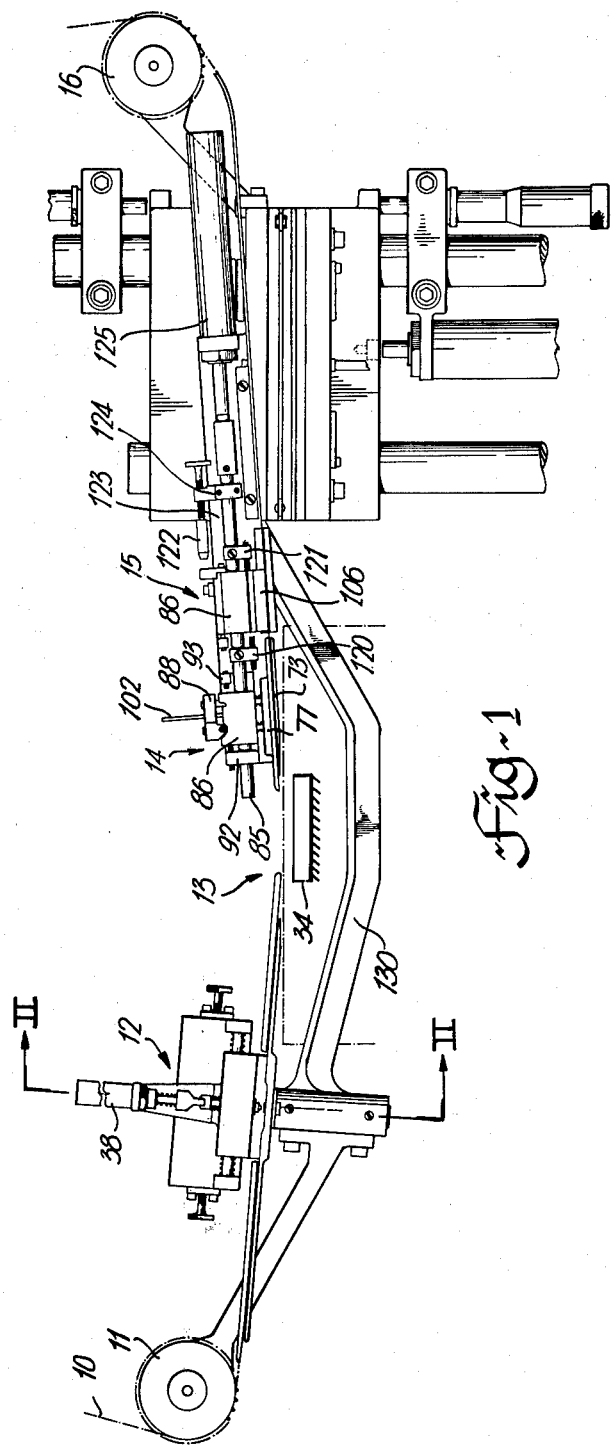

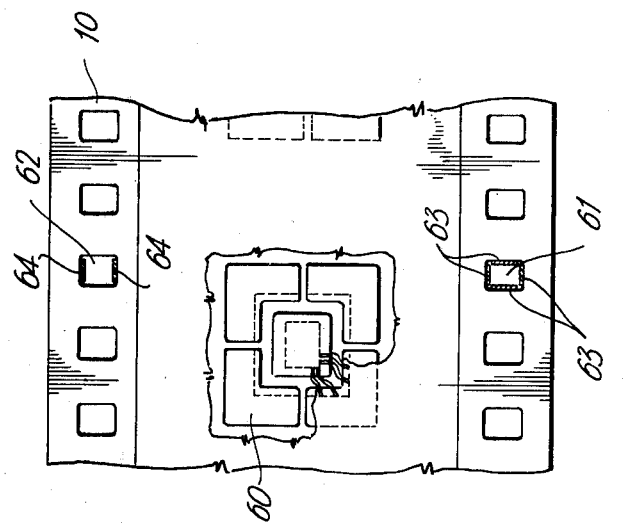
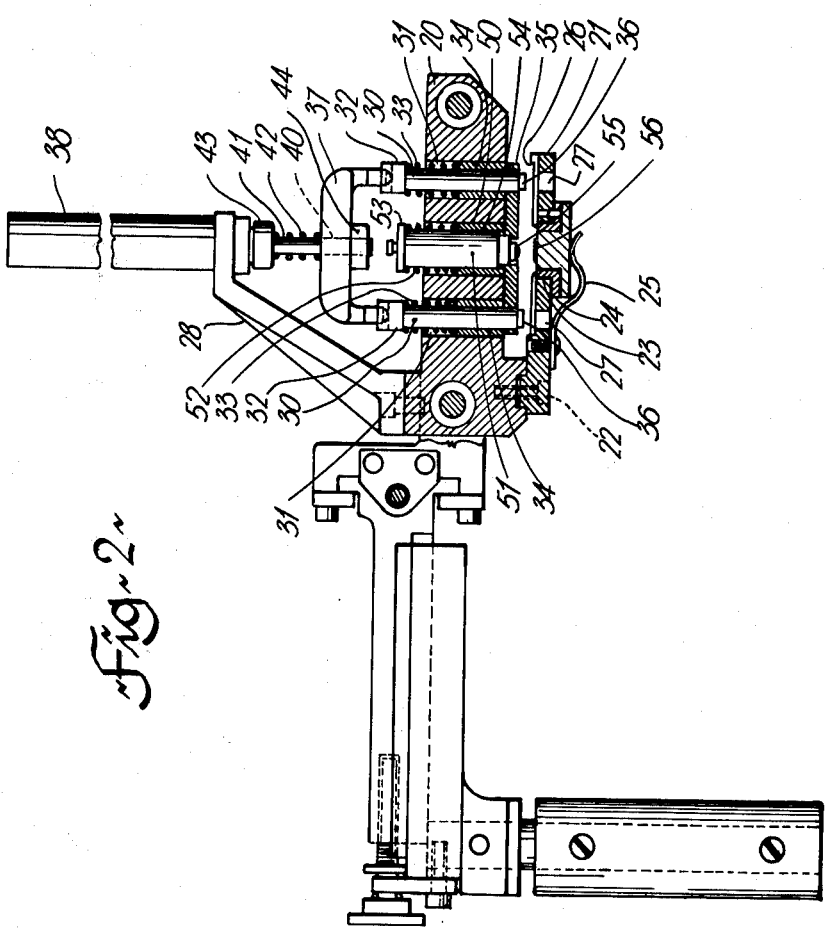

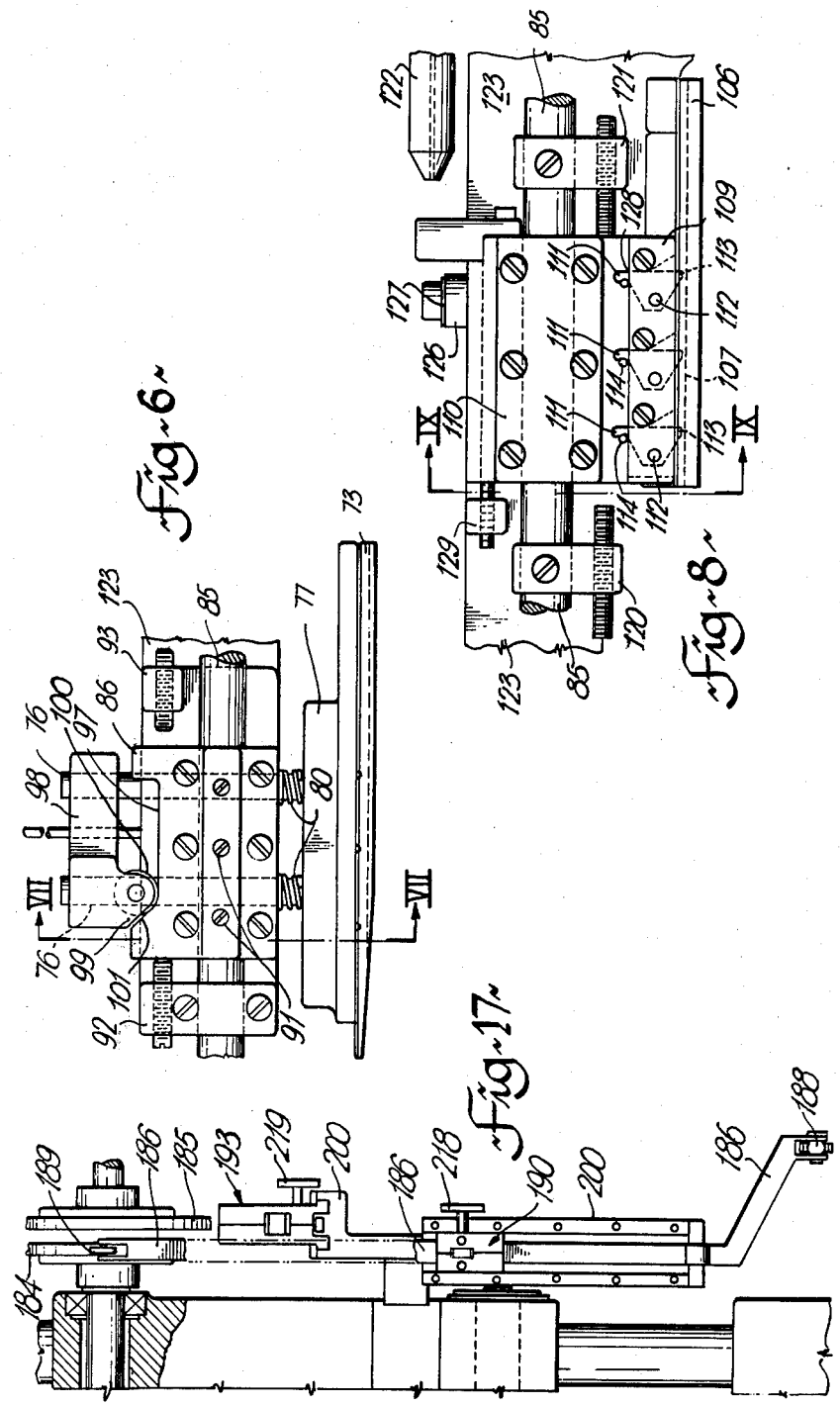

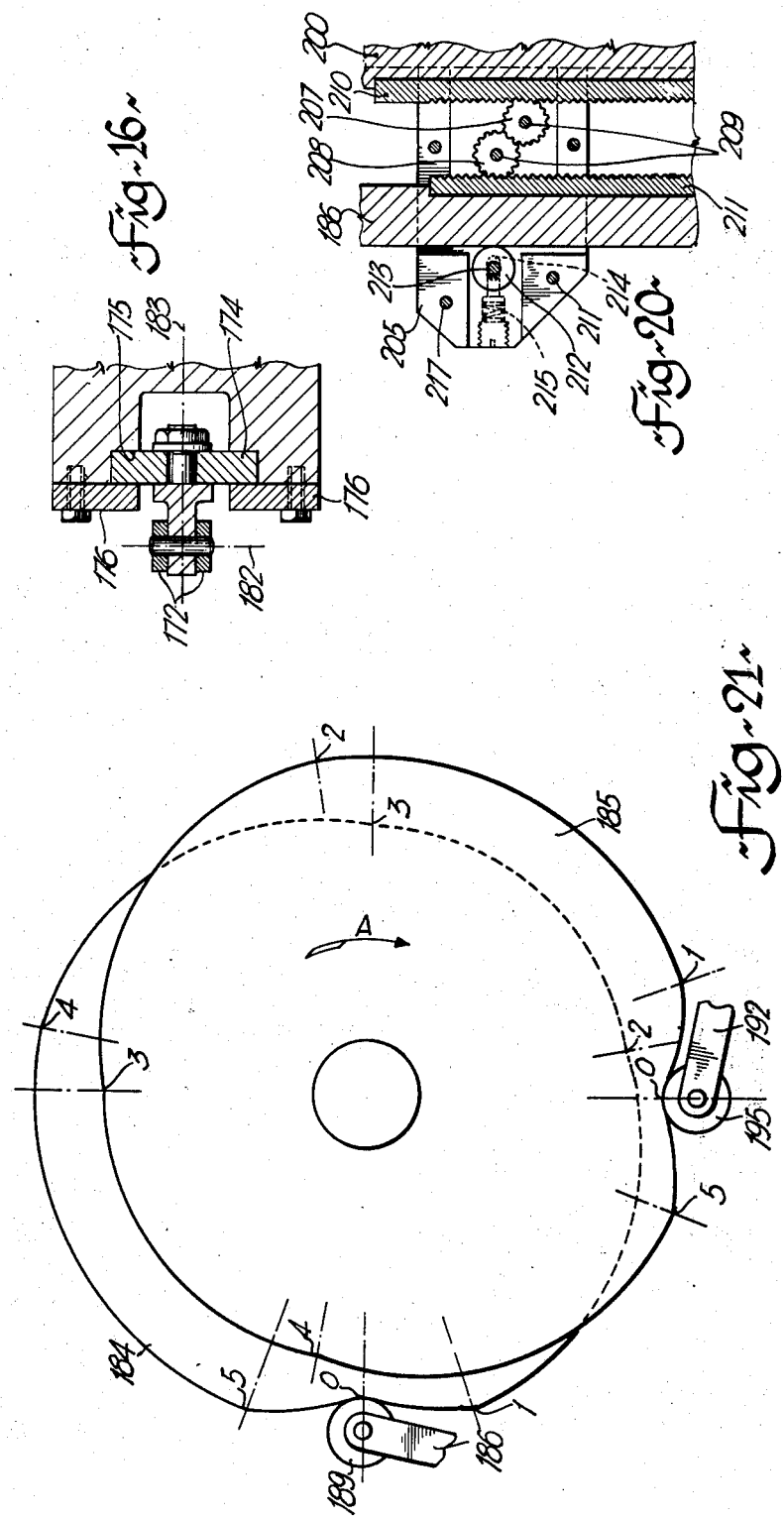

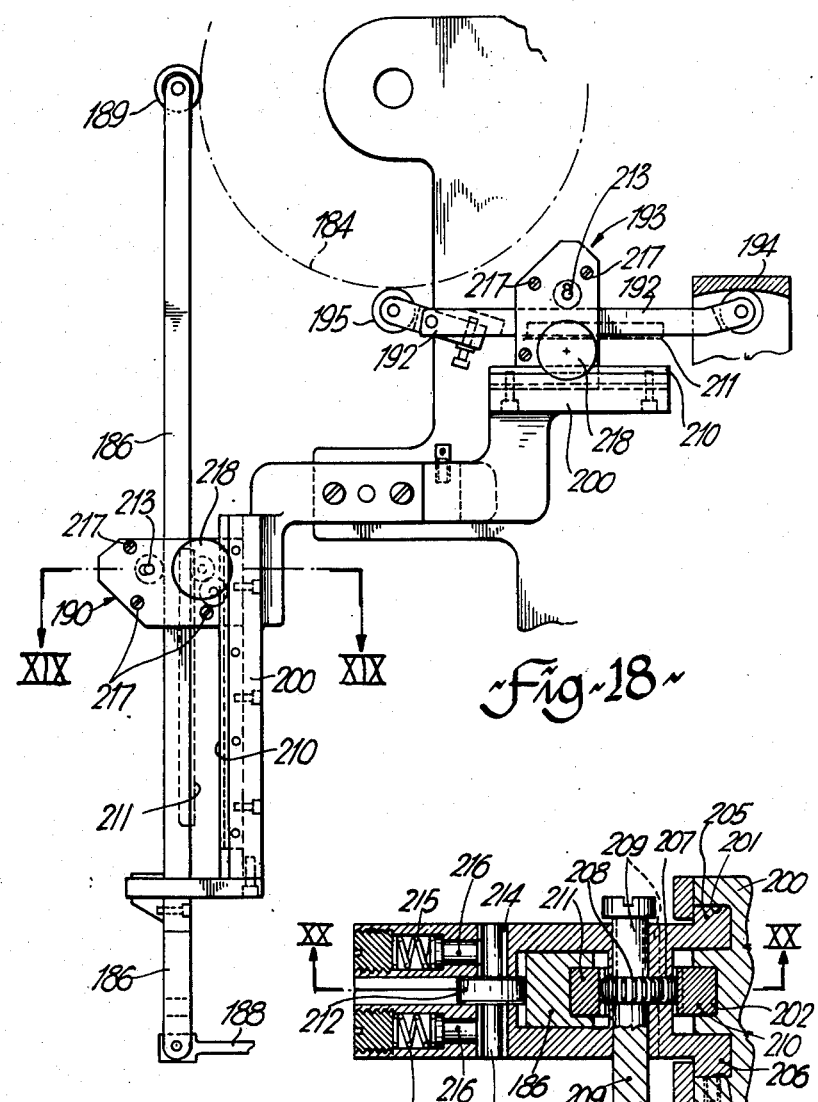

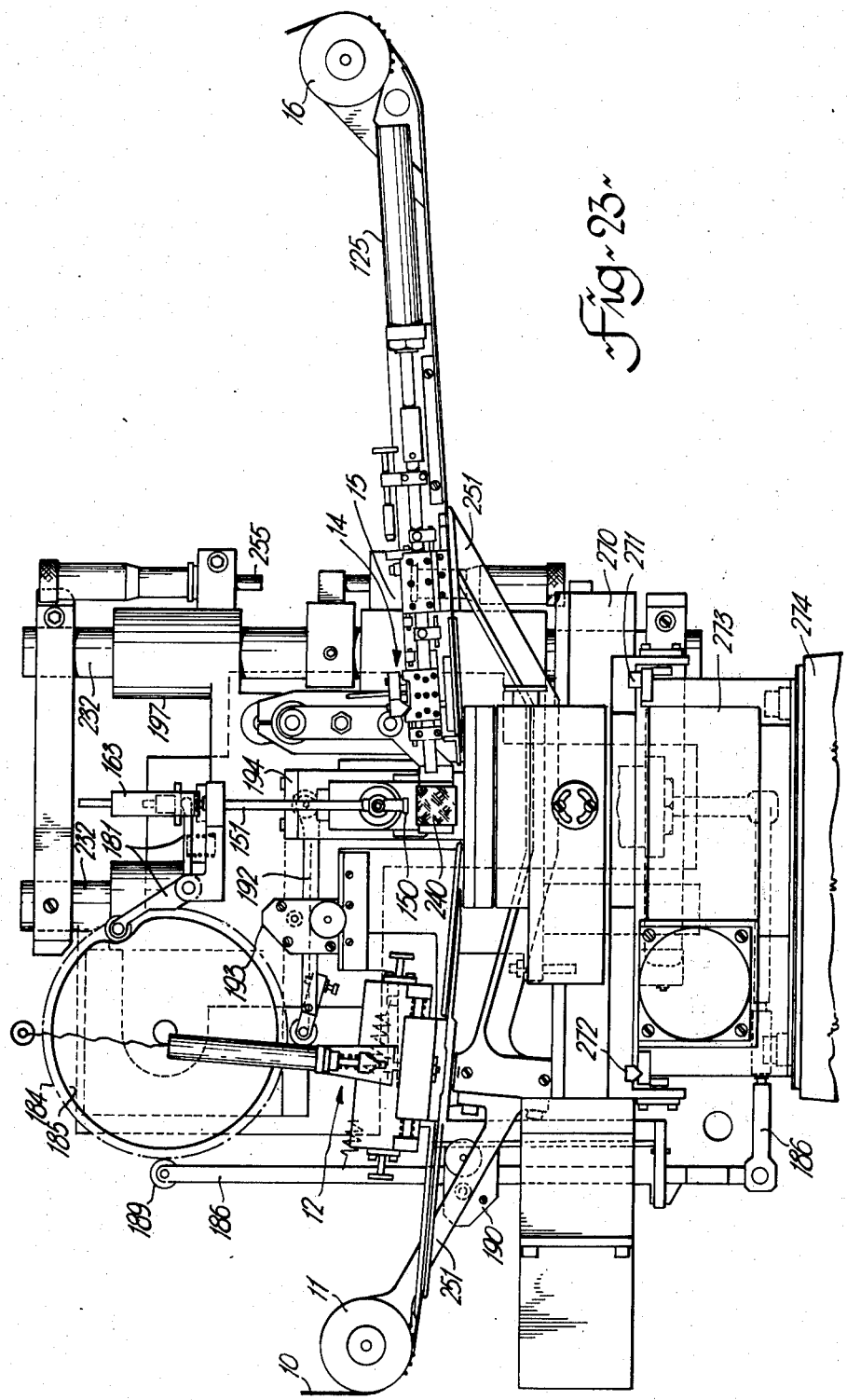

APPARATUS FOR PREFORMING WIRE LEADS AND ALIGNMENT FOR BONDING

This invention relates to apparatus for preforming wire leads for bonding of the leads to contacts and to alignment of the leads, and lead frames, particularly for preforming wire leads prior to bonding to semiconductor devices.

Wire leads, particularly for semiconductor devices, for example integrated circuits, have been individually bonded. This is expensive in labour costs, and because of the extremely small size of components and thickness of the leads, is an exacting and tiring operation, with resultant high rates of non-effective bonds. It is also possible to bond all the leads on a frame by an apparatus which ultrasonically bonds the leads with a tool which rests on the leads while the leads are in contact with contact areas. To overcome slight variations in levels of the leads, and contact areas, the tool can be given a "wobble" movement, in which a contact position moves progressively round the periphery of the bonding surface of the tool.

With such an apparatus, frames are bonded one at a time, as is the case with the bonding of leads one at a time. A die or chip is positioned, the frame laid over, and then the leads bonded. After bonding the frame and die is removed and a new die positioned. A new frame laid over and the operation repeated. There is still a large labour content even when using a bonding apparatus.

The present invention provides an apparatus for successively and continuously feeding frames, preassembled into long strips, through a preforming position and then to the bonding position, automatically. Extreme precision is required for positioning the frames and dies to ensure correct bonding, as will be described.

In the present invention, perforations in the strip of frames are used to preposition the frames prior to preforming and prior to bonding. By using the same perforations in the masking and etching of the frames, a high degree of positional accuracy can be obtained. The frame strip is allowed to float at the positioning stages to ensure correct alignment.

The invention will be readily understood by the following descriptions of an embodiment, by way of example, in conjunction with the accompanying drawings, in which:

FIG. 1 is a side view of a preforming apparatus, together with positioning and feed positions;

FIG. 2 is a cross-section through the preform head on the line II—II of FIG. 1;

FIG. 3 is a plan view of a length of film carrying lead frames;

FIG. 6 is a side view of the positioning or alignment head to a larger scale;

FIG. 8 is a side view of the feed mechanism to a larger scale;

FIG. 16 is a cross-section on the line XVI—XVI of FIG. 14;

FIG. 17 is a side view, in the direction of the arrow Y in FIG. 15, illustrating the tool actuating cams and levers in more detail;

FIG. 18 is a cross-section on the line XVIII—XVIII of FIG. 14, illustrating the cams, levers and pivotal point adjustment mechanism;

FIG. 19 is a cross-section on the line XIX—XIX of FIG. 18;

FIG. 20 is a cross-section on the line XX—XX of FIG. 19;

FIG. 21 is a view of the cams as on a line XXI—XXI of FIG. 14;

FIG. 23 is a front view of one form of complete apparatus.

Figure 9:
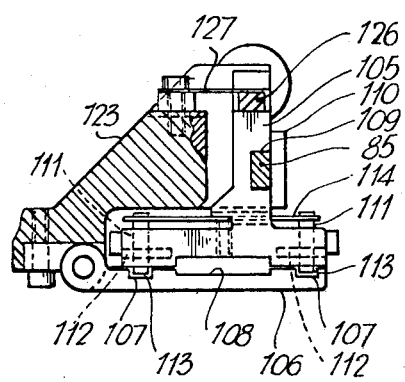
FIG. 9 is a cross-section at the entry end of the feed mechanism, on the line IX—IX of FIG. 8.

As illustrated generally in FIG. 1, a film 10 carrying lead frames is fed via a toothed pulley 11 into a preform apparatus indicated at 12. In the apparatus 12 the film is located accurately, as will be described, using perforations in the film. After performing, the film is fed to a bonding station, which is at 13, where, for example, the preformed leads are supersonically bonded or welded to the related contact areas on the lead frame by a bonding machine as described and illustrated in copending application Ser. No. 729,197 filed Oct. 4, 1976 now U.S. Pat. No. 4,037,772.

To ensure the extremely close alignment necessary between die and lead frame, the film carrying the lead frames is located by a locating head 14 positioned close to the bonding position. Feed mechanism 15 provides step by step feed of the film, which finally issues from the assembly and passes over toothed pully 11. The bonded lead frames and dies are wound up on a spool, the successive turns separated by a separator strip to avoid damage.

For automatic bonding of dies to lead frames, extreme accuracy is required. For example the location of the beams or wires of the frame in relation to the bonding pads on the die cannot vary more than 0.0005 inch as certain manufacturing tolerances must be provided for in the forming of the lead frame and the die pattern. If locating accuracy of more than 0.0005 inch is allowed then it is possible that insufficient overlap of lead and associated bonding pad occurs.

Firstly, considering the preforming of the leads, the preform apparatus 12 is seen in transverse cross section in FIG. 2. The apparatus comprises a main support member 20 underneath which is positioned a support table 21. Support table 21 is attached to the support member 20 at the rear, by screws 22 and is spaced a short distance below the bottom surface of the support member. A central aperture 23 holds a platform 24 which is held in the aperture 23 by a leaf spring 25. In operation the film 10 passes over the table 21 and the top surface of the table is recessed slightly at 26 to give some location to the film. Two further apertures 27 coincide with the positions of the rows of perforations along each side of the film.

Supported above the support member 20, by means of a bracket 28, is a locating and preforming device. This comprises two plungers 30 spaced apart the distance between the two rows of perforations in the film. Each plunger 30 is mounted in a bore 31 in the support member for axial movement. The upper end of each plunger is enlarged, at 32, and a compression spring 33 surrounds the upper part of each plunger, one end of the spring abutting against the enlargement 32 and the other end resting on the end of a bush 34 in the bore 31. The springs 33 bias the plungers upwards.

The lower ends of the plungers 30 extend slightly from the bottom of the support member 20 and are connected by a yoke 35. The extreme lower ends 36 of the plungers 30 are reduced in dimension to fit into the perforations of the film, as will be described in more detail. The upper ends of the plungers 30 are acted upon by a further yoke 37 which in turn is, in the present example, acted upon by a hydraulic cylinder and piston assembly 38.

There is a central bore 40 in the yoke 37 through which passes the piston rod 41 of the cylinder and piston assembly 38. A compression spring 42 is situated between the yoke 37 and an enlargement 43 on the piston rod 41. The lower end of the piston rod has a collar 44 attached thereto.

There is also a central bore 50 in the support member 20 and a further plunger 51 slides axially therein. A compression spring 52 extends between an enlargement 53 at the top end of the plunger 51 and a bush 54 in the central bore 50 to bias plunger 51 upwards. There is a clearance between the top of the plunger 51 and the lower end of the piston rod 41. The lower end of the plunger 51 is shaped to form a preforming head 55.

In operation, with a film carrying lead frames positioned in the apparatus, initial actuation of the cylinder and piston assembly 38 moves piston rod 41 downwards which in turn causes the yoke 37 to be pushed down by compression spring 42. Downward movement of the yoke 37 pushes the plungers 30 downwards and the lower ends 36 into a perforation in each row of the film perforations. The film is free to move both forwards or backwards — relative to the feed direction, and also sideways. It is arranged that the lower end 36 of one of the plungers located on all four edges of the related perforation, while the lower end 36 of the other plunger locates only on two opposite edges of its related perforation.

Considering FIG. 3, which is a plan view of a length of film 10 with lead frames 60 therein, there are indicated two perforations 61 and 62, one in each row of perforations. For perforation 61 the related end 36 of the plunger 30 registers or locates on all four sides of the aperture, as indicated by the thick lines 63. For perforations 62, the related end 36 registers or locates on only two sides — in the examples as indicated by the thick lines 64. The locating at 63 provides location of the film in both X and Y axes, and the locating at 64 provides rotational alignment. By this means the film, and the lead frame, in the preforming apparatus is correctly positioned.

Following this alignment, which occurs on the initial movement of the piston rod 41, continued downward movement of the piston rod 41 takes up the clearance between the lower end of the piston rod and the upper end of the plunger 51 which is then pushed downwards. The lower end of preforming head 55 moves into contact with the ends of the beam leads and pushes them into a die 56 to preform them. The piston rod then withdraws upwards, the central plunger 51 moving upwards under the action of spring 52 and then the yoke 37 and plunger 30 move upward.

Figure 4:
FIG. 4 is a cross-section on the line IV—IV of FIG. 3 showing the leads before preforming.
Figure 5:
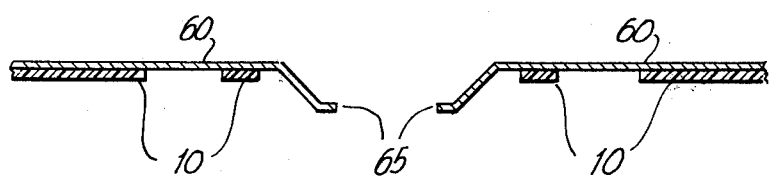
FIG. 5 is a similar cross-section to that of FIG. 4, but showing the leads after preforming.

FIGS. 4 and 5 are cross sections through a lead frame and film, before and after preforming respectively. The film is indicated at 10, the lead frame at 60 and the leads at 65. The film and the associated lead frame is depressed slightly when the locating ends of the plungers 30 enter the perforations. When the locating plungers and preforming plunger lift out of engagement, the film lifts slightly also, and this lifts the preformed ends of the leads 65 out of the die 56 to permit forward feeding of the film without interference between leads and die. By such preforming it is assured that the ends of all the leads are substantially in the same plane prior to bonding.

From the preforming station, or apparatus the film and associated lead frames progresses to the bonding stage, indicated at 13 in FIG. 1. The actual form of bonding apparatus can vary, one example being described in copending application Ser. No. 729,197 filed Oct. 4, 1976, now U.S. Pat. No. 4,037,772. For completeness this apparatus will be described later in conjunction with FIGS. 10 to 22.

The film, and lead frames, is fed stepwise by a feed mechanism, indicated at 15 in FIG. 1, through an alignment apparatus indicated at 14 in FIG. 1. The alignment apparatus 14 is positioned as close as possible to the bonding stage to provide the highest degree of accuracy.

Figure 7:
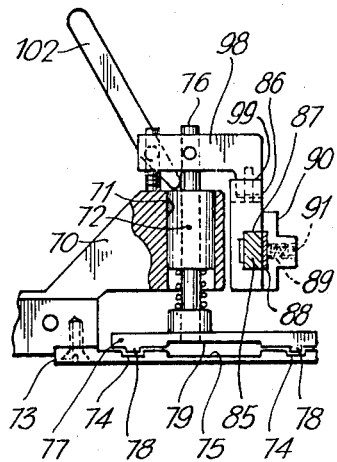
FIG. 7 is a cross-section through a positioning head on the line VII—VII of FIG. 6.

The locating or alignment apparatus is seen in more detail in FIGS. 6 and 7. It comprises a support bracket 70 having two vertical bores 71 having bushes 72. From the bottom of the support bracket extends a support table 73. The table has two recesses 74 in its upper surface spaced apart the distance between the rows of perforations in the film A central recess 75 extending right across the table provides clearance for the semiconductor chip or die which has been bonded to the leads of the lead frame.

Passing through the bushes 72 are rods 76 carrying a locating member 77 at its lower end. The bottom surface of the locating member 77 has two projections 78 opposite the recesses 74 in the support table 73. There is also a central recess 79 extending across the bottom surface of the locating member to provide clearance. The projections 78 act in a similar manner as the lower ends 36 of plungers 30 of the preform apparatus 12. One projection 78, for example the front one — on the right in FIG. 7 — engages with a perforation in one row in the film on all four sides of the perforation. This gives X and Y axes location. The other projection 78 engages only with two opposite sides of a perforation in the other row and ensures that the film is also correctly oriented.

The locating member 77 is urged downward by a compression spring 80 and the locating member is thus biased downwards in contact with the support table 73.

The apparatus is actuated by the lateral movement of a sliding bar 85. In the locating apparatus 14 the bar 85 supports a block 86. The block has a recess 87 in which the bar 83 can slide and a friction member 88 is held in engagement with the bar by means of springs 89 in a cap 90. The springs are positioned in threaded holes in the cap 90 being backed up by set screws 91. The set screws enables the spring force, and thus the friction between the friction member 88 and bar 85, to be adjusted.

The support bracket 70 also carries two stops 92 and 93 which limit lateral movement of the block 86. Stop 92 also provides a sliding biasing for the bar 85. In the top surface of the block 86 is a recess 97 having one end inclined, the left hand end in FIG. 6. Attached to the upper ends of the rods 76 is a bracket 98 which has a projection 99 projecting downwards into the recess 97. The projection carries a roller 100 and lateral movement of the bar 85 and block 86 — to the right in FIG. 1 — causes the roller to move up the inclined end — indicated at 101 — of the recess 97. This lifts the rods 76 and the locating member 77 against the springs 80. The projections 78 are freed from the film perforations and enables the film to be fed forward. A small lever 102 is provided for manual lifting of the locating member, the lever pivotally mounted on the support bracket 70 and engaging under the bracket 98.

Actuation of the locating or alignment apparatus will be further described in conjunction with the feed apparatus 15. As with the preforming apparatus 12, the film in the locating or alignment apparatus 14 is free to move so that it is exactly aligned, or positioned by the projections 78, on the locating member 77.

The feed mechanism 15 is seen in more detail in FIGS. 8 and 9. The feed mechanism comprises a feed member 105, beneath which extends a support table 106. Table 106 has two parallel grooves 107 which coincide with the perforations in the film and also a central recess 108, which extends for the whole table, providing clearance for the semiconductor chip or die. The feed member 105 is mounted on the bar 85, the bar sitting in a recess 109 and retained by a cover 110.

At the lower end of the feed member are two rows of fingers 111. The fingers are pivotted on pins 112. The lower ends 113 of the pins extend down to engage in the recesses 107 in the support table 106. At their upper ends the fingers bear against spring wires 114.

Attached to the bar 85, on either side of the feed member 105, are two stop members 120 and 121 and a further stop member 122 is mounted on the main support structure 123, an extension of which forms the support bracket 70 (FIGS. 6 and 7) of the locating apparatus 14. The stop member 122 also provides a support bearing 124 (FIG. 1) for the bar 85. Attached to the end of the bar 85, in the present example, is a pneumatic ram 125 (FIG. 1).

The operation of the locating or alignment apparatus and the feed apparatus is as follows. At the beginning of a feed operation, the ram 125 is extended and the bar 85 is in the position as in FIG. 1, and also FIGS. 6 and 8. The locating member is locating the film and the block 86 is against the stop 92. The feed mechanism is in engagement with perforations in the film via the lower ends 113 of the fingers 111 and is in contact with stop 121.

On initial movement of the ram — to the right in FIGS. 1, 6 and 8, the feed mechanism remains stationary, held by a friction member 126 supported by a spring 127 from the main support structure 123. The block 86 of the locating member is moved laterally — to the right in FIGS. 1 and 6 — by frictional engagement between bar 85 and block 86, until the block engages with stop 93. This movement causes the roller 100, and the bracket 98 to lift, lifting the locating member 77 and projections 78 clear of the film.

The ram continues to move the bar 85 and stop 120 of the feed apparatus moves into contact with the feed member 105. Feed member moves sideways until it engages stop 122. As the feed member 105 moves the fingers, in engagement with the film by means of their lower ends 113 being positioned in perforations in the film, move the film. The fingers cannot pivot clockwise as seen in FIG. 8, as the fingers are in recesses, the top edges of which abut against the top ends of the fingers, at positions indicated at 128 in FIG. 8.

At the end of the lateral movement — to the right — the ram then reverses and moves to the left together with the bar 85. The initial movement of the bar moves the block 86 of the alignment apparatus to the left — FIGS. 1 and 6 until it contacts the stop 92. As this movement occurs the roller 100 runs down the inclined end surface 101, lowering the bracket 98 and thus the locating member 77, under the bias of the springs 80. The projections 78 engage with perforations in the film and correctly locate it. The bar 85 continues to move and stop 121 of the feed apparatus contacts the feed member 105 and it is moved laterally — to the left in FIGS. 1 and 8. The fingers 111 are able to pivot outerclockwise, against the bias of the spring wires 114 and thus ride over the film "clicking" over a predetermined number of perforations. The feed member eventually contacts a stop 129 attached to the main support structure 123. At this position the feed apparatus remains stationary with the locating apparatus locating the film accurately for bonding of the lead frame to the semiconductor chip or die.

The various stops 92, 93, 120, 121 and 129 are provided with adjustable abutments in the present example threaded rods, which permit of fine adjustment of the relative positions of the stops.

After a predetermined time period, during which the preform apparatus 12 is actuated and the bonding apparatus positioned at 13 is actuated, the feed cycle is repeated to feed the film on the distance between the centers of two dies or chips. The complete cycle of preforming, bonding, feeding and locating is controlled by a conventional electrical system which actuates the various rams in sequence.

The bonding apparatus is illustrated in FIGS. 10 to 22.

Figure 10:
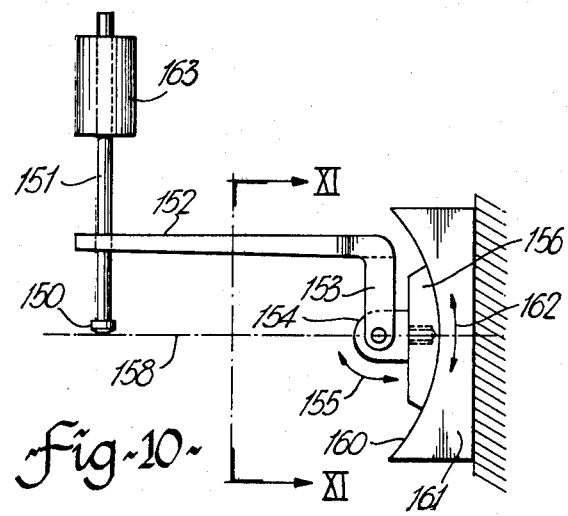
FIGS. 10 and 11 are diagrammatic views illustrating the basic features of a bonding apparatus, FIG. 11 being a cross-section on the line XI—XI of FIG. 10.
Figure 11:
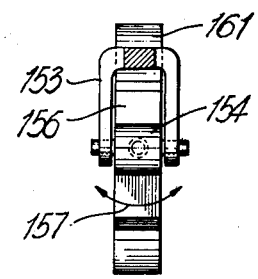

As illustrated in FIGS. 10 and 11, a bonding tool 150, at the base of a member 151 is held in a support member or arm 152. Member 152 is cranked or bent down at its end remote from the tool 150 and is also divided to form a fork 153. The fork 153 encompasses a spigot 154, the fork being pivotally mounted on the spigot 154 to rotate as indicated by arrows 155. The spigot 154 is itself pivotally mounted in a slider member 156 for rotation as indicated by arrows 157. The axes of rotation of the fork 153 on the spigot 154 and the spigot 154 in the slider member 156 are coincidental and are also in a plane 158 which is tangential to the bonding surface 159 of the tool 150 — seen more clearly in FIG. 12.

The slider member 156 slides along an arcuate surface 160 of a bearing member 161, as indicated by arrows 162. The axis of the arcuate surface 160 is on the plane 158 and is at the interception of this plane with the bonding surface 159 of the tool 150.

Figure 13:
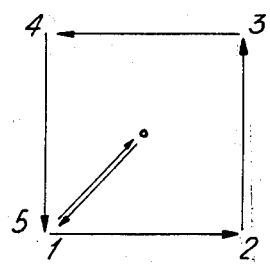
FIG. 13 is a diagram of the progression of the contact position of the bonding surface.
Figure 12:
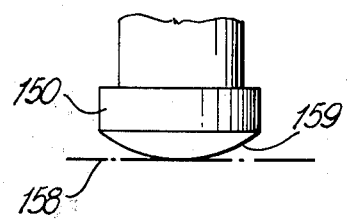
FIG. 12 is an enlarged view of the bonding surface of the bonding tool, illustrating the relationship thereof with the pivotal axes of the apparatus.

The tool is brought into the operating position by rotating the arm 152 on the spigot to lower the tool 150, to a central position — 0 in FIG. 13. By simultaneously moving the slider 156 up and rotating the spigot 154 — couterclockwise in FIG. 11 — the contact position moves to 1 in FIG. 13. The spigot 154 is then rotated — clockwise in FIG. 11 — to move the contact position to 2 in FIG. 13. Movement of the slider 156 down moves the contact position to 3 in FIG. 13, then rotation of the spigot 154 couterclockwise (in FIG. 13) moves the contact position to 4, and finally upward movement of the slider 156 moves the contact position to 5 in FIG. 13, which coincides with 1. The tool is lifted and slider and spigot return to a central position. The movement of the contact position from 1 to 5 in FIG. 13 is continuous and there is contact at all times. As a lead is passed over by the tool it is bonded to a contact area beneath it on a die or chip. Ultrasonic vibration is applied to the head, and weight is applied at 163.

The above description only described the basic features of the invention. The movement of the arm 152, spigot 154 and slider 156 can be obtained in a variety of ways. Also it is likely to be desired to vary the amount of movement. A more specific example of one form of apparatus is illustrated in FIGS. 14 to 21 as an example.

Figure 14:
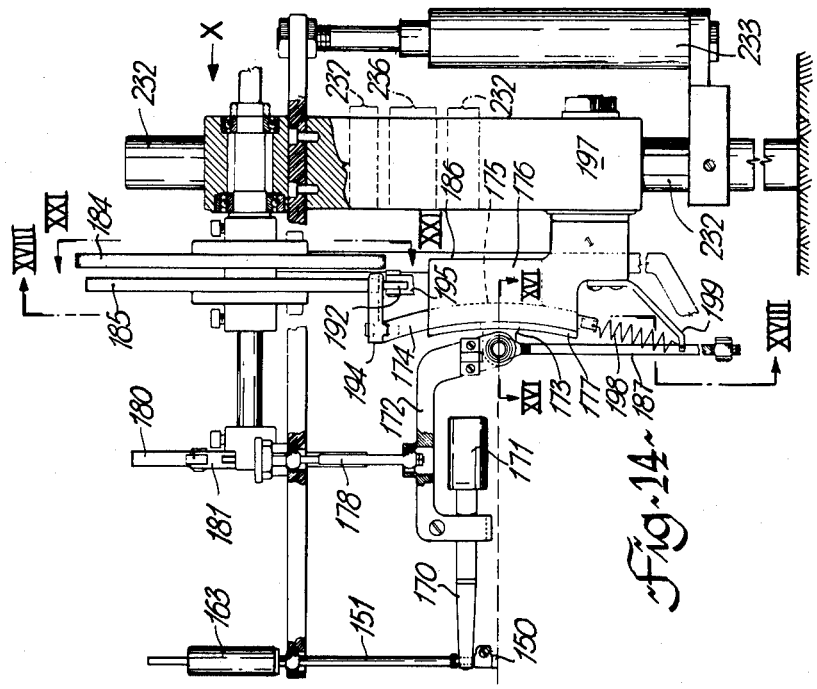
FIG. 14 is a side view of the apparatus, partly diagrammatic.

As illustrated in FIG. 14, the bonding tool or head 150 is at the lower end of member 151 with a weight 163 on the upper end of member 151 as in FIG. 10. The arm 152, of FIG. 10, is indicated by horn 170 carrying a coil 171 which provides supersonic vibration to the horn 170. The horn 170 is rigidly mounted at one end of a fork member 172. At its other end the fork member 172 is pivotally attached to spigot 173, which corresponds to spigot 154 of FIG. 10. Spigot 173 is pivotally mounted on arcuate slider 174 which slides in an arcuate channel 175 in a main support member 176, and retained in the channel by cap members 177. The channel 175, slider 174 and cap members 177 are seen in FIG. 16 which is a cross section through the channel.

The fork member 172 is pivotally supported at a position intermediate its ends by a lift member 178. Lift member 178 is used to lift the fork member 172, with the horn 170 and tool 150, to raise the tool clear of workpieces between bonding operations. Lift member 178 is actuated by a cam 180 and pivotted lever 181. When the lift member lowers the fork member, horn and tool, the fork member is effectively disengaged in that the fork member is completely free to pivot on the spigot 173 about an axis which is coincidental with the bonding face of the tool 150, the axis indicated at 182, (FIG. 16) and is also completely free to pivot about a further axis, also coincident with the bonding surface of the tool 150 and normal to the axis 182, indicated at 183 (FIG. 16).

The two pivotal movements are obtained from two cams 184 and 185. Cam 184 actuates a pivotal lever 186 which in turn actuates lever 187 through a third lever 188. Lever 187 is actuated at its lower end by the lever 188 and at its upper end lever 187 is attached to the spigot 173. Thus radial movement of the follower 189 on cam 185 pivots lever 186 about its pivotal mounting position 190, moves lever 188 laterally and moves the lower end of lever 187. This is the movement indicated by the arrows 157 in FIG. 11.

Cam 185 actuates a lever 192 which is pivotally supported at a position 193 intermediate its ends. The cam 185 acts on one end of lever 192, and the other end of lever 192 engages with a projection 194 on the top end of the slider 174. This movement of the one end of lever 192 by the cam 185 produces up down sliding movement of the slider 174. This produces a pivoting of the fork lever 172 on the spigot 173, and about a pivot point on the bonding face of the tool 150. The combined movements to produce this latter pivoting are those indicated by arrows 155 and 162 in FIG. 10. Rollers 195 and 196 are provided at each end of the lever 192.

The slider 174 is spring biased downwardly by tension spring 198 connected between the lower end of the slider and a bracket 199 attached to the support member 176.

The entire mechanism is mounted on a main frame member 197 which in turn is mounted for vertical movement on columns 232. The frame member 197 can be moved up and down by a pneumatic ram assembly 233. This is seen in FIG. 23.

The pivotal positions of the levers 186 and 192 can be made variable to provide for variation in the amount of movement applied to the tool. FIGS. 17 and 18 illustrate a particular form of adjustable pivotal point for each lever. Thus for lever 186 a variable pivot mechanism is provided at position 190 and for lever 192 a similar variable pivot mechanism is provided at position 193. The actual form of the variable pivot mechanisms are essentially the same, comprising opposed racks with which engage two pinions, the pinions themselves in mesh with each other.

FIGS. 19 and 20 illustrate in more detail one of the variable pivot mechanisms, as an example the mechanism at position 190, the mechanism being shown in cross-section. The support structure 200 has three grooves 201, 202 and 203 therein. In the central groove 202 is fastened a rack 204. In the outer grooves 201 and 203 are positioned support brackets 205 and 206, a bracket slidable in each groove. The brackets cooperate to rotatably support two pinions 207 and 208, the pinions supported on shafts 209 carried in the support brackets 205 and 206. The pinion 207 meshes with the rack 210.

The brackets are recessed to provide an enclosure around the lever 186. Lever 186 is slidable in the recesses in the brackets and carries a further rack 211, with which the pinion 208 meshes. The lever 186 is spring loaded towards the pinions 207 and 208 by a roller 212 mounted on a shaft 213 supported in elongated holes 214 in the brackets 205 and 206. Springs 215 act upon plungers 216 which in turn act on the shaft 213. The roller 212 and pinions 207 and 208 are positioned in recesses formed in the brackets 205 and 206. The two brackets are held together by screws indicated at 217. A knob 218 is attached to one end of the shaft 209 carrying pinion 208.

By rotating the knob 218, pinion 208 is rotated, which in turn rotates pinion 207 — the pinions rotate in opposite directions. This rotation of the pinions moves the brackets in one direction or the other depending upon the direction of rotation of the knob. Thus, in the example described, for shaft 186, and considering FIGS. 18, 19 and 20, turning knob 218 clockwise (FIG. 18) would rotate pinion 208 clockwise and pinion 207 anti-clockwise — and this would move the brackets 205, 206 downward. The lever 186 actually pivots on the pinion 208 and movement of the brackets downward also moves pinion 208 downward and therefor moves the pivotal point of lever 186 downward. Downward movement of the pivot point varies the relationship between the two parts of lever 186 — on either side of the pivot point, and in this particular example reduces the movement of lever 188. The length of lever 188 can be adjusted by a turnbuckle 218.

The mechanism at pivot position 193 for lever 192 is similar in form, but as lever 192 is shorter, shorter racks are provided. The same reference numerals are applied. In the mechanism at position 193, clockwise rotation of the knob 218 moves the brackets to the right, in FIG. 18. This would reduce the movement of the arcuate slider 174.

Figure 15:
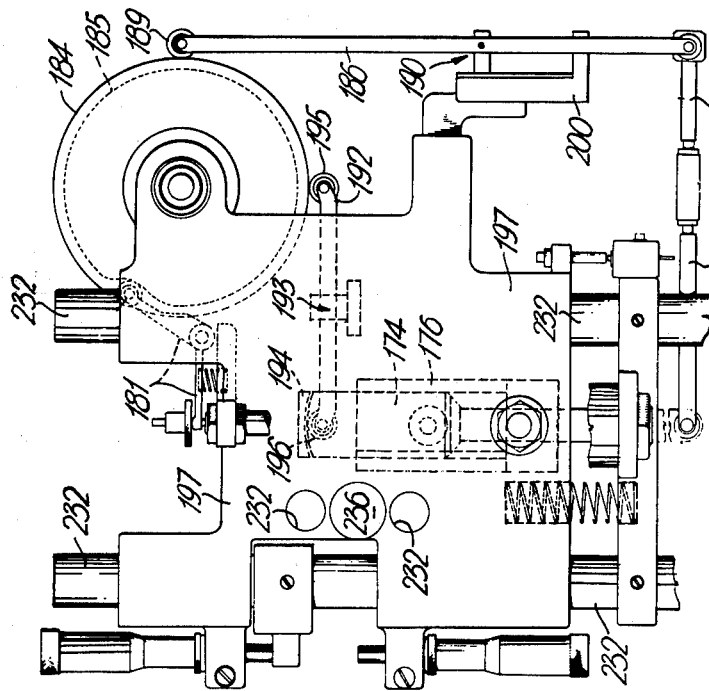
FIG. 15 is a view in the direction of arrow X in FIG. 14, part of the support structure deleted for clarity.

The cams 184 and 185 are illustrated diagrammatically in FIG. 15. The forms of the cams are seen more clearly in FIG. 21, the cams positioned and outlined as looked at from the front of the apparatus. The configuration of the cams should be considered in conjunction with FIG. 13. FIG. 13 is effectively a plan view of the movement of the contact position on the surface 159 of the tool 150, standing in front of the apparatus and looking down.

Starting with the contact position at the centre of the tool — position O in FIG. 17, the cam followers 189 and 195 — for levers 186 and 192 respectively, are at positions O on cams 184 and 185 respectively. The cams rotate clockwise, as viewed from the front and as indicated by the arrow A. The first rotational movement of the cams 184 and 185 lifts follower 189, which via levers 186, 187 and 188 rotates the spigot 173 outer-clockwise, and simultaneously via follower 193 and lever 192 moves the arcuate slider member 174 upwards. This moves the contact position on the tool 150 both sideways and forwards to position 1 and the followers will be at positions 1 on the cams 184 and 185.

Continued rotation of the cams maintains follower 195 at a constant radius with no movement of lever 192 or of slider 174. Follower 189 moves inwards which results in a clockwise rotation of the spigot 173. This moves the contact position from 1 to 2 in FIG. 13 and the followers are then at positions 2 on the cams. Further rotation of the cams from positions 2 maintains follower 189 at a constant radius, with no movement of lever 186 and thus no rotation of the spigot 173. Follower 193 moves inwards — moving lever 192 and moves the slider 174 down with the contact position on the tool moving to position 3, in FIG. 13, the followers at positions 3 on the cams.

Rotation of the cams continues with the follower 193 now remaining at a constant radius and no movement of the slider 174, while follower 189 moves outwards resulting in outer-clockwise rotation of the spigot 173. The contact position on the tool moves to 4 in FIG. 13 and the followers are at positions 4 on the cams. Then, on the next rotational movement of the cams 184 and 185 the follower 189 remains at a constant radius, with no rotation of the spigot 173, and follower 193 moves outwards moving the slider 174 upwards. This moves the contact position on the tool to 5 in FIG. 13 and the followers are at positions 5 on the cams.

Finally with the cams coming to a full revolution followers 189 and 193 move inwards rotating the spigot clockwise and the slider down to finish with the contact position on the tool at O and the followers also at O on the cams.

The rotation of the cams 184 and 185 is continuous — and quite slow, and the contact position actually traces a path as in FIG. 13. The ultrasonic generator 123 is operating all the time the tool contact position moves from position 1 round to position 5 and bonds any leads it passes over.

As previously described the tool is lifted out of engagement by means of cams 180 and lever 181. As seen in FIG. 15 the follower 220 for lever 181 is resting on the minimum radius portion of the cam 180 and this will have lifted the tool up. This will correspond to the position O in FIG. 13 and positions O on cams 184 and 185. As the cams 184 and 185 rotate to move the contact position from 0 to 1 cam 180 also rotates, lifting follower 220 and allowing the tool to move down. Contact between tool and workpiece does not actually occur until just prior to position 1. The tool remains down during the following rotation of cams 184 and 185 and cam 180 until position 5 is reached. Further rotation of all the cams results in the follower 220 moving inwards, lifting the tool. Thus actual contact finishes just after position 5.

The actuation of the apparatus can be cycle by cycle, each cycle being initiated by an operator. Between cycles, the tool being lifted, the lead frame and die which have been bonded is removed and a new lead frame and a new die placed in position. Alternatively the actuation can be made automatic, with continuous supply of lead frames and dies in sequence to the bonding position. An example of a preforming, aligning and feeding apparatus is described in our copending application Ser. No. 729,197 filed Oct. 4, 1976, now U.S. Pat. No. 4,037,792.

Conveniently, for automated bonding, the lead frames are prepared in long strips and fed one by one beneath the bonding head. The dies, or chips, are carried on a substrate or support by being attached to the surface of the support by, for example, wax. Hot air is circulated through the bonding tool — or it is heated by some other means such as electrically — and as the leads are bonded to the die the die is warmed to a temperature sufficient to soften the wax. By the time bonding is complete, the wax is sufficiently softened to permit the die to be lifted free of the support as the lead frame is fed from beneath the bonding tool.

The dies are mounted on the support in a predetermined pattern which enables the dies to be positioned sequentially beneath the bonding tool by moving the support through a predetermined path. For example they can be arranged in lines across the support which can then be indexed across in straight lines, being moved laterally by the space of one line after a line of dies has been bonded to leads. Another arrangement is to position the dies in a series of concentric circles, the support rotating under the tool to present the dies in sequence. After one circle has been bonded the support is moved to position the next circle for passing under the bonding tool.

To check that dies are correctly positioned a binocularscope or other similar device, not shown, can be positioned adjacent the apparatus for looking at the die, as it is in the bonding position. As it is very difficult, at the least, to position the viewing device so that the dies can be seen, without interfering with the operation of the apparatus, a prism is mounted on the apparatus, the prism withdrawn when the tool is in operation, but being capable of being moved to a position above a die when the bonding tool is lifted up, as by the cam 40. The viewing device is then positioned to be aimed at the prism and thus the die can readily be seen. Means are provided on the mounting for the support carrying the dies for moving the support along two axis and also for rotating the support.

Figure 22:
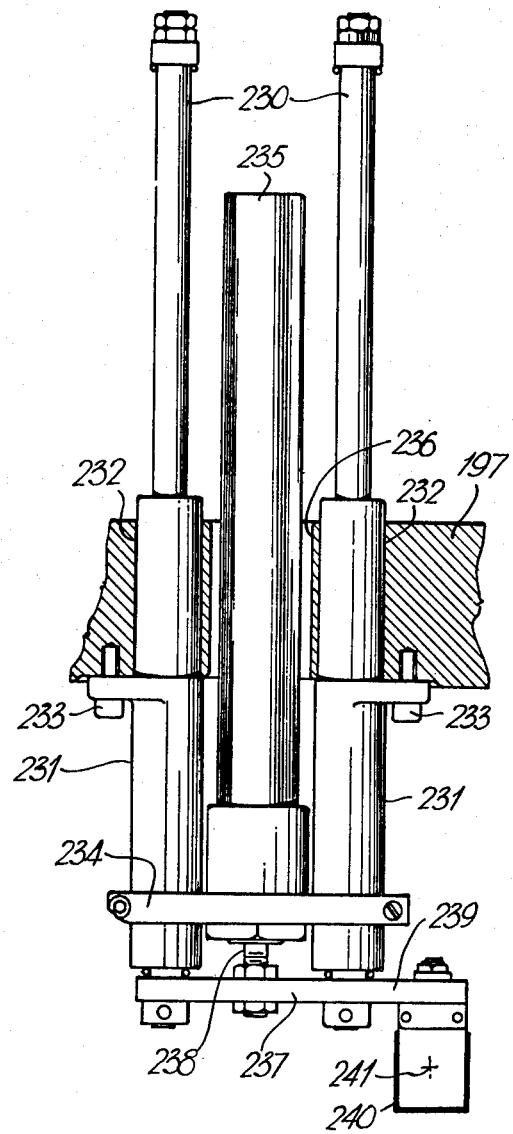
FIG. 22 is a side view of a prism mounting system.

The prism is illustrated particularly in FIG. 22 and seen also in FIG. 23. The prism is mounted on two slides 230. Slides 230 are supported in bushes 231 extending through bores 232 in the frame member 197 and extending from the front face of the frame member. The bushes are attached to the frame member by screws 233 and are connected at their outer ends by a bridging member 234. Attached to the bridging member 234 is the cylinder of a pneumatic ram 235, the cylinder extending rearwards through a further bore 236 in the frame member 197. The bores 232 and 236 are seen in FIG. 15.

The forward ends of the slides 230 are connected by a cranked lever 237, to which is also attached the forward end of piston rod 238 of the pneumatic ram 235. The lever 237 extends downwardly and sidways at 239 and carries at its lower end a prism 240.

When the sonic welding head is in the operative position — that is with the frame member in its downward position — the prism is in its withdrawn position, as in FIG. 22. When the frame member 197 is raised by the pneumatic ram 235, the prism 240 is moved forward by the pneumatic ram 235. When in the forward position, the central axis of the prism — indicated at 241 — is exactly below the centre of the bonding tool 150. A binocular — not shown — also sights on the prism and the viewer sees the die positioned beneath the prism, the lead frame above the die, and also the bonding tool optically superposed thereon. It is possible to vary the position of the lead frame to ensure that it is aligned with the die.

The support structure 197 is connected to the structure supporting the preform apparatus 12 and feed mechanism 15 by a beam 251 (FIG. 23), to make a unitary whole. The beam 251 is carried at one end on the support structure 197 which is mounted on the vertical slides 232. The pneumatic ram 233 acts on the support structure 197 and moves the support structure and the beam 251 up and down a small distance. The upward movement of the beam 251 lifts the film 10 clear of the support table holding the preassembled dies. This lifting also lifts the die — which has been bonded to the leads of the lead frame at the bonding station — clear of the substrate from which it has been freed — for example by the hot air through the bonding tool melting the holding wax, as previously described. The ram 233 is actuated to lift the support structure 197 and beam 251 after bonding (and after preforming) while the feed is actuated. When the film has been fed to the next position, the support structure and beam is lowered for a new preforming cycle and bonding cycle. An adjustable abutment 255 is provided for the support structure 197.

FIG. 23 is a front view of one form of machine having the various items previously described, i.e. the preforming 12, the bonding tool 150, sighting prism 240, locating and alignment apparatus 14 and feed mechanism 15. The support beam 251 is carried on a base member 270 mounted for forward and rearward movement on slides 271 and 272. The slides 271 and 272 are in turn mounted on a further member 273 which is mounted for sideways movement on slides, not shown attached to the machine base 274.

I claim:

1. Apparatus for preforming unsupported inner ends of cantilever wire leads of lead frames, for bonding said inner ends of said leads to contacts, said lead frames being in a continuous strip and including perforations along each side of said strip and in a predetermined positional relationship with said lead frames, comprising:

means for successively feeding lead frames to a preforming position;

positioning means for positioning each lead frame in a predetermined position at said preforming position, said inner ends of said leads extending over a recessed die;

preforming means at said preforming position and including a support member and a support table extending under said support member, said recessed die supported on said support table;

said positioning means including locating plungers axially slidable in said support member, one on either side of said die and having lower ends for passing through said perforations;

said preforming means including a further plunger axially slidable in said support member and having a lower end for bending said inner ends of said leads out of the plane of the lead frame, said further plunger positioned over said die;

actuating means extending over the upper ends of said locating plungers and said further plunger and moveable towards said support member, initial movement of said actuating means sliding said locating plungers to engage their lower ends in said perforations and continued movement sliding said further plunger to preform said inner ends of said leads, each end preformed to include an inclined intermediate portion and a substantially flat end portion extending substantially parallel to the plane of said lead frame.

2. Apparatus as claimed in claim 1, said perforations of substantially rectangular form, one of said locating members engaging on all four sides of one perforation at one side of said strip and the other of said locating members engaging on only two opposed sides of the related perforation at the other side of said strip.

3. Apparatus as claimed in claim 1, further including a lead bonding position, said means for successively feeding said lead frames to said preforming position also feeding said lead frames to said bonding position after preforming and bonding means at said bonding position for bonding said inner ends of said leads to said contacts.

4. Apparatus as claimed in claim 3, said bonding position including a support member and means for supporting semiconductor chips on said support member for positioning sequentially beneath said bonding means, said wire leads bonded to contacts on said chips.

5. Apparatus as claimed in claim 3, including alignment means adjacent to said bonding position, said alignment means comprising an upper member and a support table extending beneath said support member and an aligning member slidably mounted in said support member for movement towards and away from said support table, said alignment member including two projections extending downward therefrom and positioned to engage with a perforation on each side of said strip.

6. Apparatus as claimed in claim 5, said projections of substantially rectangular form, one of said projections engaging on all four sides of one perforation at one side of said strip and the other of said projections engaging on only two opposed sides of the related perforation at the other side of said strip.

7. Apparatus as claimed in claim 1, said means for successively feeding said strip comprising:

a feed member;
    a support table extending beneath said feed member;
    a plurality of fingers extending from a lower surface of the feed member, said fingers extending in two rows spaced apart in said feed member and positioned to engage with said perforations on each side of said strip;

means for reciprocating said feed member in a direction corresponding to the longitudinal axis of said strip;

said fingers mounted in said feed member to engage with said perforations and move said strip on one direction of movement of said feed member and to disengage from said perforations on the other direction of movement of said feed member.

8. Apparatus as claimed in claim 7, said fingers resiliently mounted in said feed member for retraction from said perforations on said other direction of movement of said feed member.

9. Apparatus as claimed in claim 5, said means for successively feeding said strip comprising:

a feed member;

a support table extending beneath said feed member;

a plurality of fingers extending from a lower surface of the feed member, said fingers extending in two rows spaced apart in said feed member and positioned to engage with said perforations on each side of said strip;

means for reciprocating said feed member in a direction corresponding to the longitudinal axis of said strip;

said fingers mounted in said feed member to engage with said perforations and move said strip on one direction of movement of said feed member and to disengage from said perforations on the other direction of movement of said feed member.

10. Apparatus as claimed in claim 9, said means for reciprocating said feed member comprising an axially moveable rod, said rod extending through said support member of said alignment means to actuate said aligning member on said other direction of movement of said feed member.

11. Apparatus as claimed in claim 10, including a lost motion means between said rod and said feed member whereby on initial movement of said rod in a direction corresponding to said one direction of movement of said feed device, said feed device is maintained stationary, said initial movement of said rod actuating said aligning member to disengage from said strip.

12. Apparatus as claimed in claim 3, further including:

a bonding tool, said tool including an arcuate bonding surface for contact with said leads at said lead bonding position;

a support member having a forward end and a rearward end, said bonding tool attached at said forward end;

means supporting said support member, at said rear end, on a main support structure, said means comprising a two axis pivotal structure;

said two axis pivotal structure including a pivot for reciprocal rotation of said support member about a first axis extending from said main support structure and tangential to said arcuate bonding surface, said pivot mounted on a pivot support member mounted for reciprocal movement about a second axis normal to said first axis and tangential to said arcuate bonding surface, said first and second axes intersection on said arcuate bonding surface at a bonding position thereon;

means for reciprocating said pivot and said pivot support member about said first and second axes respectively, in a predetermined cycle whereby said bonding position on said bonding surface moves over the arcuate bonding surface in a predetermined path.

13. Apparatus as claimed in claim 12, including a bearing member having an arcuate bearing surface centered on said second axis, said pivot support member mounted on said arcuate bearing surface and reciprocal thereon.

14. Apparatus as claimed in claim 12, said means for reciprocating said pivot support member comprising a first rotary cam and a lever system extending between said first cam and said pivot support member; and said means for reciprocating said pivot comprising a second rotary cam and a lever system extending between said second cam and said pivot.

15. Apparatus as claimed in claim 12, said bonding tool a supersonic bonding tool, means for applying a weight to said tool and means for applying supersonic vibration to said tool.

16. Apparatus as claimed in claim 15, said support member comprising:

a horn having a forward end attached to said bonding tool and a rearward end carrying said means for applying supersonic vibrations to said tool; and a fork member having a forward end attached to said horn and a rear end attached to said pivot.

17. Apparatus as claimed in claim 16, said fork member pivotally attached at said rear end to said pivot for pivotal movement of said fork member, and said bonding tool in a vertical plane, and means connected to said fork member for lifting said fork member to lift said bonding tool from said intersection position of said first and second axes.

18. Apparatus as claimed in claim 17, said means for lifting said fork member comprising a third rotary cam and a lever system extending between said third cam and said fork member, said third cam having a rotational relationship relative to said first and second cams whereby said fork member and said bonding tool are lifted after said bonding position on said bonding surface of said bonding tool completes one said predetermined cycle.

19. Apparatus as claimed in claim 14, each of said lever systems including a lever having a pivot position intermediate its ends, each said pivot position moveable in a direction parallel to the longitudinal axis of the related lever to vary the pivot position thereof relative to the ends of the lever, whereby the reciprocation of the pivot and the pivot support member can be varied as desired.

20. Apparatus as claimed in claim 12, including a main support structure comprising a frame member slidably supported on columns for vertical reciprocal movement, said pivot support member attached to said frame member, and means for moving said frame member in said columns to lift and lower said bonding tool from and to an operative position.

21. Apparatus as claimed in claim 20, including a viewing member mounted for reciprocation into a predetermined position for viewing of a device at said operative position when said tool is lifted from said operative position.

22. Apparatus as claimed in claim 21, said viewing member including a reflecting surface whereby said device can be viewed in a microscope.

23. Apparatus as claimed in claim 14, said first and second rotary cams mounted on a common shaft in a predetermined rotational relationship for simultaneous rotation, and means for rotating said shaft.

* * * * *